United States Patent [19]
Zhang et al.

[11] Patent Number: 5,477,272
[45] Date of Patent: Dec. 19, 1995

[54] VARIABLE-BLOCK SIZE MULTI-RESOLUTION MOTION ESTIMATION SCHEME FOR PYRAMID CODING

[75] Inventors: Ya-Qin Zhang, Acton, Mass.; Sohail Zafar, Fairfax, Va.

[73] Assignee: GTE Laboratories Incorporated, Waltham, Mass.

[21] Appl. No.: 96,148

[22] Filed: Jul. 22, 1993

[51] Int. Cl.$^6$ .................................... H04N 7/30
[52] U.S. Cl. .......................... 348/407; 348/699
[58] Field of Search ................... 348/398, 397, 348/402, 408, 416, 420, 699, 700, 701, 390, 384, 407

[56] References Cited

U.S. PATENT DOCUMENTS

| | | | |
|---|---|---|---|
| 5,014,134 | 5/1991 | Lawton et al. | 358/261.3 |
| 5,067,015 | 11/1991 | Combridge et al. | 348/398 |
| 5,142,360 | 8/1992 | Niihara | 348/699 |
| 5,206,723 | 4/1993 | Parke | 358/105 |
| 5,272,530 | 12/1993 | Cassereau | 348/416 |
| 5,276,513 | 1/1994 | van der Wal et al. | 348/699 |
| 5,321,776 | 6/1994 | Shapiro | 382/56 |
| 5,347,479 | 9/1994 | Miyazaki | 364/725 |
| 5,351,086 | 9/1994 | Park | 348/402 |

FOREIGN PATENT DOCUMENTS

WO9309637  5/1993  WIPO.

OTHER PUBLICATIONS

E. Adelson, "Orthogonal Pyramid Transforms for Image Coding," SPIE Visual Communication and Image Processing II, vol. 845, pp. 50–58, 1987.

P. Burt et al., "The Laplacian Pyramid as a Compact Image Code", IEEE Trans. Commun., vol. COM–31, pp. 532–540, Apr. 1983.

W. Chen et al, "Scene Adaptive Coder," IEEE Trans. Communications, pp. 225–232, Mar. 1984 (vol. COM–32, No. 3).

I. Daubechies, "Orthonormal Bases of Compactly Supported Wavelets," Communications on Pure and Applied Mathematics, 1988 vol. XL1909–996.

I. Daubechies, "The Wavelet Transform, Time–Frequency Localization and Signal Analysis," IEEE Trans. Info. Theory, vol. 36 No. 5 pp. 961–1005 Sep. 1990.

S. Mallat, "Multifrequency Channel Decompositions of Images and Wavelet Models," IEEE Trans. Acoustics, Speech and Signal Processing, vol. 3 No. 12 Dec. 1989 pp. 2091–2110.

S. Mallat, "A Theory for Multiresolution Signal Decomposition: The Wavelet Representation," IEEE Trans. on Pattern Analysis and Machine Intelligence, vol. 11 No. 7, Jul. 1989 pp. 674–693.

J. Woods and S. O'Neil, "Subband Coding of Images," IEEE

(List continued on next page.)

*Primary Examiner*—Tommy P. Chin
*Assistant Examiner*—Bryan S. Tung
*Attorney, Agent, or Firm*—J. Stephen Yeo; Victor F. Lohmann, III

[57] ABSTRACT

A novel variable-size block multi-resolution motion estimation (MRME) scheme is presented. The motion estimation scheme can be used to estimate motion vectors in subband coding, wavelet coding and other pyramid coding systems for video compression. In the MRME scheme, the motion vectors in the highest layer of the pyramid are first estimated, then these motion vectors are used as the initial estimate for the next layer and gradually refined. A variable block size is used to adapt to its level in the pyramid. This scheme not only considerably reduces the searching and matching time but also provides a meaningful characterization of the intrinsic motion structure. In addition, the variable-MRME approach avoids the drawback of the constant-size MRME in describing small object motion activities. The proposed variable-block size MRME scheme can be used in estimating motion vectors for different video source formats and resolutions including video telephone, NTSC/PAL/SECAM, and HDTV applications.

8 Claims, 7 Drawing Sheets

OTHER PUBLICATIONS

Trans. Acoustics, Speech and Signal Proc. vol. ASSP–34, No. 5 pp. 1278–1288 Oct. 1986.

P. Burt, "Multiresolution techniques for image representation, analysis, and smart transmission," SPIE Visual Communications and Image Processing IV, vol. 1199, Nov. 1989 pp. 2–15.

K. Utz et al., "Interpolative Multiresolution Coding of Advanced Television with Compatible Subchannels," IEEE Trans. on Circuits and Systems for Video Technology, vol. 1, No. 1, Mar. 1991 pp. 86–99.

Zafar et al. "Predictive Block–Matching Motion Estimation Schemes for Video Compression" (Digest) IEEE Int. Conf. Consumer Electronics, Jun. 6–8, 1991 FPM 21.1.

$\longrightarrow \Delta(x,y)$
$\dashrightarrow V(x,y)$

VARIABLE-BLOCK SIZE MULTI-RESOLUTION MOTION ESTIMATION SCHEME FOR PYRAMID CODING

FIELD OF THE INVENTION

The present invention relates to video coding and, more particularly, to a motion estimation scheme.

BACKGROUND OF THE INVENTION

A video frame may be characterized by a multiresolution signal representation. Existing multi-resolution motion estimation schemes find motion vectors in the original image domain using constant block size for block matching, (see, for example, K. M. Uz et al. in "Interpolative Multiresolution Coding of Advanced Television with Compatible Subchannels," IEEE Transactions on Circuits and Systems for Video Technology, Vol.1, No. 1 (March 1991)). In coding applications employing this multiresolution representation, motion estimation is performed by comparing a region being coded in a current frame with regions in a previous frame to compute a displacement vector in accordance with a matching criterion.

An inherent disadvantage is that the motion estimation is unable to detect motion activities for small objects in the lower resolution representations.

SUMMARY OF THE INVENTION

A method of computing motion vectors for a frame in a full-motion video sequence comprises the steps of: transforming said video frame into a multifrequency, multiresolution domain representation by decomposing said frame into a plurality of subframes each with an associated resolution and occupying a respective frequency band, wherein a one of said subframes has the lowest resolution; dividing each subframe into a set of blocks defining a grid, wherein the size of each block is based on the associated resolution of said subframe; calculating a motion vector, relative to a previous frame, for each block of said lowest resolution subframe; calculating motion vectors of each block of said other subframes, comprising the steps of scaling a motion vector corresponding to a respective block of said lowest resolution subframe, and calculating a motion vector, relative to the previous frame, for said block under motion compensation using the scaled motion vector.

DETAILED DESCRIPTION OF THE PREFERRED EMBODIMENTS

The method disclosed in this invention estimates motion vectors in the pyramid domain after decomposition. Variable block size is used to adapt to different levels of the pyramid. It also avoids the drawback of constant-size multi-resolution motion compensation (MRMC) in describing small object motions.

Compared with the conventional transform coding, the pyramid coding technique is more flexible and can be easily adapted to the nature of human visual system. It is also free from blocking artifacts due to the nature of its global decomposition. In video coding, some type of inter-frame prediction is often used to remove the inter-frame redundancy. Motion-compensated prediction has been used as an efficient scheme for temporal prediction. In typical pyramid representations such as wavelet decomposition, a video frame is decomposed into a set of sub-frames with different resolutions corresponding to different frequency bands.

A multiresolution representation of image f(k,l) with resolution depth M consists of a sequence of sub-images in a pyramid structure:

$$\{S_M f, [W_M/f]j=1,2,3, \ldots, [W/f]j=1,2,3\}$$

Figure 1:
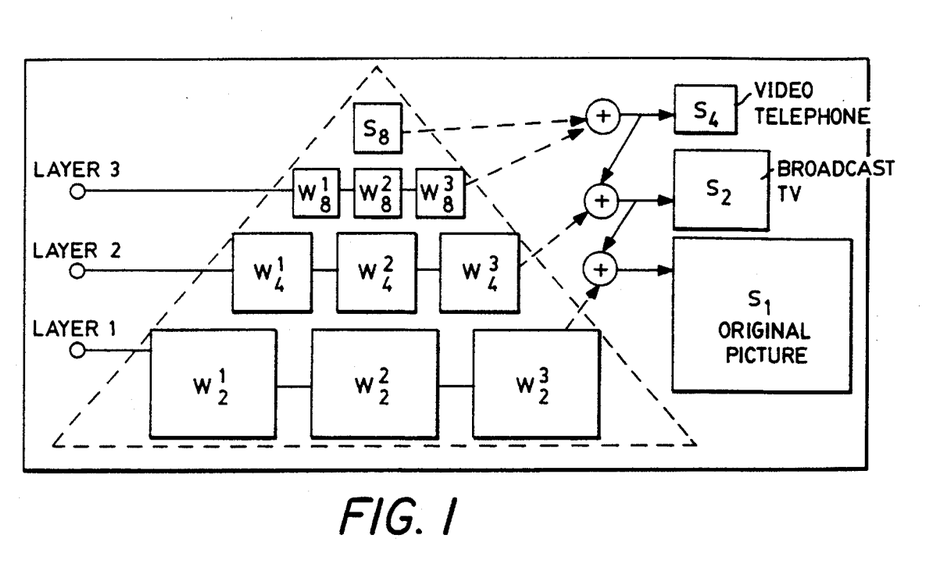
FIG. 1 is a schematic illustration of an exemplary multi-resolution representation of a video frame.

The representation is preferably explained by organizing the sub-images into a pyramid structure, shown for exemplary purposes in FIG. 1. This exemplary pyramid structure of resolution depth 3 consists of a total of 10 subbands with 3 subbands at each layer and one low-pass subband at the apex. In general, the sequence of subimages $\{S_M f: m=1, \ldots, M\}$ represents the approximations of a given video frame at multiple resolutions.

This pyramid structure is useful when there are various applications involving the same video source, each requiring a certain video resolution with a distinct quality factor. For example, a Common Intermediate Format (CIF) or a Quarter of CIF (QCIF) would be required for video telephony applications, while the CCIR 601 resolution and its subsampled version would be used in TV broadcasting environments.

As shown in FIG. 1, conversions among different resolutions are realized by assuming a simple relationship among different video source resolutions. For example, the subimage $S_4$, which is appropriate for video telephony applications, is formed by combining subimage $S_8$ with the wavelet representations from layer 3, namely $W_8^1$, $W_8^2$, and $W_8^3$. Similarly, the subimage $S_2$ is produced by combining subimage $S_4$ with the wavelets from layer 2. In this manner, signal conversions may be made among subimages with varying resolutions.

In pyramid coding schemes, a video frame is first divided into a multiresolution structure. Compared to transform coding, the pyramid structure is flexible and can be easily adapted to the nature of the human visual system. It is also free from blocking artifacts due to the nature of its global decomposition. For example, the wavelet transformation decomposes a video frame into a set of subbands with different resolutions, each corresponding to a different frequency band. These subimages are then organized into a pyramid structure to provide a pictorial representation of the signal decomposition. The wavelets (subimages) which occupy the same layer of the pyramid represent motion information at the same scale but with different frequency bands.

These multiresolution frames provide a representation of motion structure at different scales. The motion activities for a particular sub-frame in different resolutions are hence highly correlated since they actually specify the same motion structure at different scales. In the multi-resolution motion compensation scheme (MRMC) described hereinbelow, motion vectors in higher resolution are predicted by the motion vectors in the lower resolution, and are refined at each step. Prior to motion estimation, the video signal undergoing such predictive estimation is preferably divided into a plurality of blocks to facilitate block-based motion estimation.

In accordance with the present invention, an MRMC scheme is proposed which recognizes and accommodates the characteristics of the human visual sensory apparatus. Human vision, for example, is more perceptible to errors in lower frequency stimuli than those incurred in higher frequency stimuli. The MRMC scheme of the present invention approximates this feature of human vision by adapting the size of each block to its associated scale (resolution). This variable block size MRMC scheme not only considerably reduces the searching and matching time but also provides a meaningful characterization of the intrinsic motion structure. The variable-size MRMC approach also avoids the drawback of a constant-size MRMC in describing small object motion activities. The MRMC scheme described here can also be well adapted to motion-compensated interpolation.

Instructive texts on discrete wavelet theory and multi-resolution analysis may be found in:

I. Daubechies, "Orthonormal bases of compactly supported wavelets," Comm. Pure Appl. Math., vol. XLI, pp. 909–996, 1988;

S. Mallat, "Multifrequency channel decompositions of images and wavelet models," IEEE Trans. Acoust. Speech Signal Processing, vol. 17, no. 12, December 1989, pp. 2091–2110;

S. Mallat, "A theory for multiresolution signal decomposition: The wavelet representations," IEEE Trans. Pattern Anal. Machine Intell., vol. 11, no. 7, July 1989, pp. 674–693;

P. Burt, "Multiresolution techniques for image representation, analysis, and 'smart' transmission," SPIE Visual Communications and Image Processing IV, vol. 1199, Philadelphia, Pa., November 1989;

P. Burt and E. Adelson, "The Laplacian pyramid as a compact image code," IEEE Trans. Commun., vol. COM-31, pp. 532–540, April 1983;

M. Vetterli, "Multidimensional subband coding: Some theory and algorithms," Signal Processsing, vol. 6, pp. 97–112, April 1984;

J. Woods and S. O'Neil, "Subband coding of images," IEEE Trans. Acoust. Speech, Signal Processing, vol. ASSP-34, no. 5, pp. 1278–1288, October 1986;

E. Adelson, S. Simoncelli, and R. Hingorani "Orthogonal pyramid transforms for image coding," SPIE Visual Communications and Image Processing II, Boston, Mass., vol. 845, pp. 50–58, October 1987;

and E. Adelson, "Orthogonal Pyramid Transforms for Image Coding," SPIE Visual Communications and Image Processing II, Vol. 845, pp. 50–58 (1987), all incorporated herein by reference.

General Motion Estimation

Motion estimation schemes can be divided into two categories, namely block-matching and pel-recursive. A block matching scheme divides the picture into a number of blocks on the assumption that all pels within a block belong to the same object and thus possess the same motion activity. In contrast, the pel-recursive schemes attempt to estimate the motion for each individual pixel in the picture.

In a block-matching motion estimation scheme, each block in the present frame is matched to a particular block in the previous frame(s) to find the positional (horizontal-vertical) displacements of that block. A suitable matching criteria might, for example, include the Maximum Cross Correlation (MCC), Minimum Mean Squared Error (MMSE), or Minimum Absolute Difference (MAD).

Figure 3:
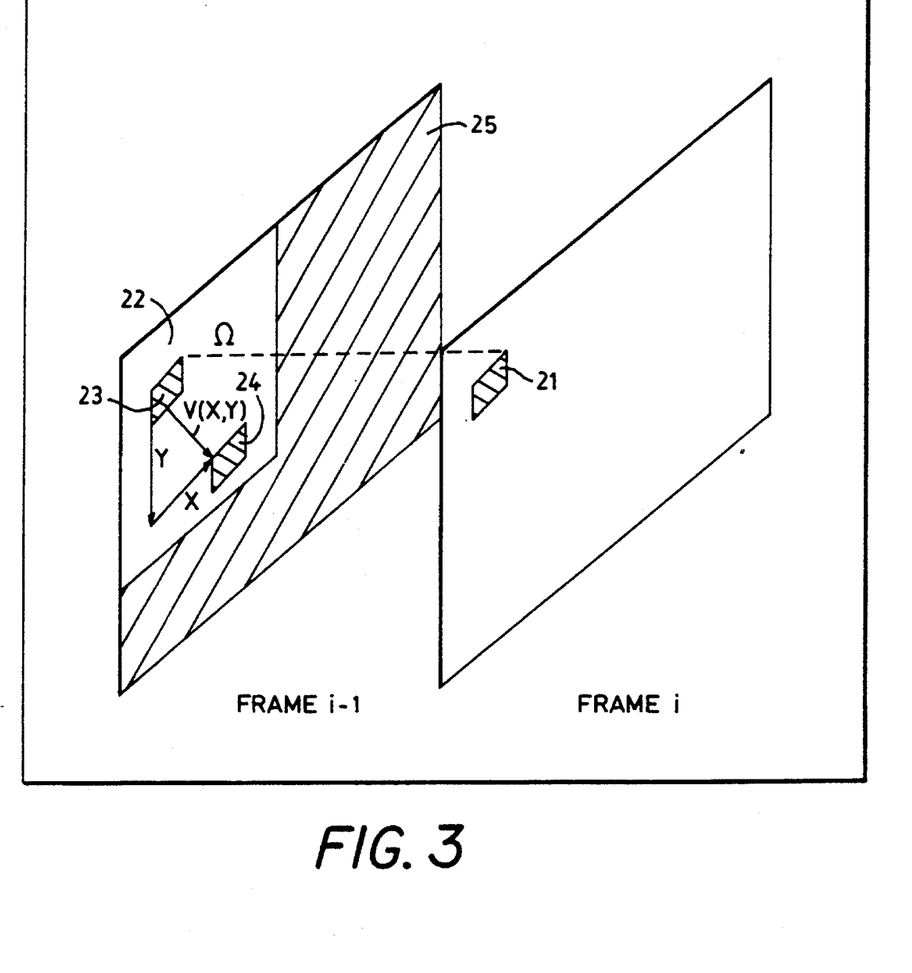
FIG. 3 depicts the spatial relationship between blocks in a current and prior video frame during a block-matching motion search.

For purposes of illustrating the principle of block-matching, reference is made to the pictorial representation in FIG. 3. A current frame i and prior frame i−1 are shown, wherein the pixel value at location $(x_1, y_1)$ for current frame i is assigned a value $I_i(x_1, y_1)$ The objective of block matching is to find a mapping function between $I_i(x_1, y_1)$ and a corresponding pixel value in the previous frame which satisfies the appropriate matching criteria. In particular, a vector $V_i(x, y)$ is sought which will reconstruct $I_i(x_1, y_1)$ from a pixel value $I_{i-1}(x_1+x, y_1+y)$ in prior frame i−1 with minimum residual error, wherein x and y denote the translation in the horizontal and vertical directions, respectively.

When viewed as a matching function, the block-matching scheme finds a best match for $I_i(x_1, y_1)$ in the previous frame (i−1) which is displaced from the present location of $(x_1, y_1)$ by $V_i(x,y)$.

The full range of x and y over which the matching vector $V_i(x,y)$ is determined is designated as a search area Q. A representative block 21 in frame i has the pixel value $I_i(x_1, y_1)$, and corresponds positionally to a block 23 in prior frame (i−1). During block-matching, a best match is sought between block 23 and another block within a search region 22 ($\Omega$). The bordering region 25 includes the remainder of the frame, but is not searched. The matching scheme finds a matching block 24 whose vector displacement V(x,y) defines the x-y displacement of block 24 from block 23.

The matching criterion employs MAD, which calculates the absolute difference between $I_i(x,y)$ and each block $I_{i-1}(x,y)$ in the neighborhood area $\Omega$ and chooses the block producing the minimum difference value. The residual video frame from motion estimation corresponding to this difference signal is quantized, coded, and transmitted.

The performance of the motion estimation scheme is affected by a number of factors, including the size of the search area $\Omega$. For example, objects moving at high speeds are better tracked as the area increases in size. This feature would be necessary in high-speed video sequences frequently depicted in television scenes, as opposed to slower moving objects in videoconferencing applications. By comparison, a small search area can easily track the motion of slow-moving objects such as in videoconferencing scenes.

Increasing the search area, however, means increasing the time required to find the motion vectors and the associated overhead. Assuming a search complexity function $O(n^2)$ per pixel where n is the size of the search area in the horizontal and vertical directions, a typical frame size of N×N would produce an overall complexity of $O[(Nn)^2]$ using a full search algorithm. Consequently, in order to reduce the computational burden of the full search algorithm which searches the entire search area $\Omega$, other sub-optimal schemes have been proposed. These proposed schemes utilize a relatively large search area but reduce the complexity by avoiding searching the entire area, thus rendering a trade-off between performance and search time. As an example, the 2D directed search has a complexity of $(2+7 \log_2 n)$ and is an extension of the bubble sort whereas the orthogonal search algorithm reduces the number of searches to $(1+4\log_2 n)$.

Multi-Resolution Motion Compensation for Multiple Resolution Video

Figure 2:
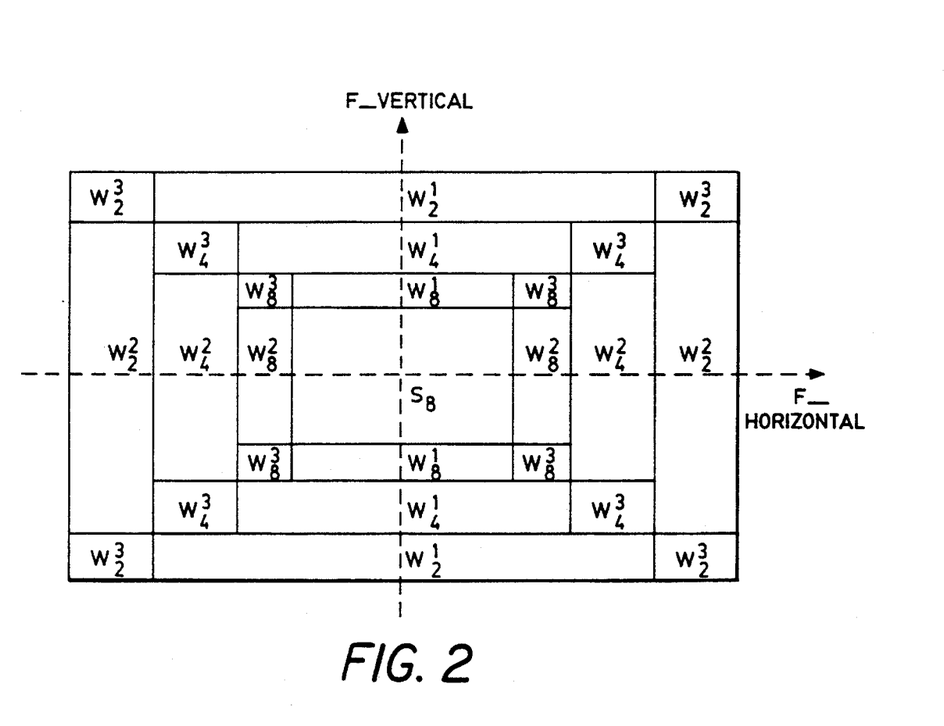
FIG. 2 is a frequency band distribution of the wavelet decompositions in FIG. 1.

As illustrated in FIG. 1 and discussed supra, a video frame to be analyzed is decomposed into a plurality of subimages with different resolutions and different frequency bands, and organized into a multi-layer pyramid structure. The subimages occupying the same layer have a common resolution (scale), wherein each of the subimages occupies a distinct frequency band. The frequency allocation for the subimages is shown in FIG. 2. Although the motion activities at different layers of the pyramid are different, the subimages from different layers are highly correlated since they actually characterize the same motion structure but at different scales and for different frequency ranges.

The illustrative video frame of FIG. 1 is decomposed into ten subimages each occupying a respective frequency subband. The subimages are organized into a three-level pyramid representation with three subbands at each of the first two levels and four subbands at the top level in which subband $S_8$ represents the lowest frequency band. This subband $S_8$ contains a major percentage of the total energy present in the original frame although it is only 1/64 of its size.

As noted above, the principal feature of the present invention is the incorporation of human visual characteristics pertaining to motion perception into inter-frame motion estimation. In particular, the inter-frame motion estimation variably adapts the size of the individual subimage blocks based upon the resolution factor of the subimage. These variable-size blocks take into account the fact that human vision is more perceptible to errors in lower frequencies than those incurred in higher bands by giving more weight to the lower resolution bands. Human vision also tends to be selective in spatial orientation and positioning; accordingly, the blocks at higher resolutions are chosen to be larger than those at lower resolutions. In addition, errors generated by motion estimation at the lowest resolution subbands will be propagated and expanded to all subsequent lower layer subbands. Therefore, motion activities in higher layers should be more accurately characterized than those in lower layers.

As explained earlier, all ten subbands have a highly correlated motion activity. The present invention implements the block size adaptation by preferably using a variable-size block of $p2^{M-m}$ by $p2^{M-m}$ for the $m^{th}$ level, thereby ensuring that the motion estimator tracks the same object/block regardless of the resolution or frequency Dand, where p by p is the block size of the highest layer M. Variable-size blocks thus appropriately weigh the importance of different layers to match the human visual perception. This scheme can detect motions for small objects in the highest level of the pyramid. Disadvantageously, constant block-size MRME approaches tend to ignore the motion activities for small objects in higher levels of the pyramid because a block size of pxp actually corresponds to a block size of $p2^{M-m} \times p2^{M-m}$ in the $m^{th}$ layer. Although the size of the blocks is preferably computed in accordance with the relationship noted above, this should not serve as a limitation of the present invention. Rather, it should be obvious to those skilled in the art that other block sizes are possible in representing the adaptability of the block size to desired characteristics of the human visual apparatus.

For 1-pixel accuracy, the variable-size MRMC approach requires much fewer computations as compared to its fixed-size counterpart since no interpolation is needed as the grid refines. In variable-size MRME, an accurate characterization of motion information at the highest layer subband produces very low energy in the displaced residual subbands and results in much "cleaner" copies of DRS for lower layer subbands. In contrast, interpolation is often required to obtain similar results when using fixed-size block schemes. The variable-block size MRME scheme in accordance with the present invention works directly on the frequency domain so many problems such as block incontinuity are avoided.

As a general principle in multi-resolution motion estimation schemes, the motion vectors are first estimated for the lowest resolution subband on the top of the pyramid. Then, motion vectors in lower layers of the pyramid are refined using the motion information obtained in higher layers, after reconstruction of the subimages in the spatial domain. The specific steps of such a variable block-size MRME scheme are outlined below for FIG. 4 in connection with the exemplary video representation of FIG. 1.

Figure 4:
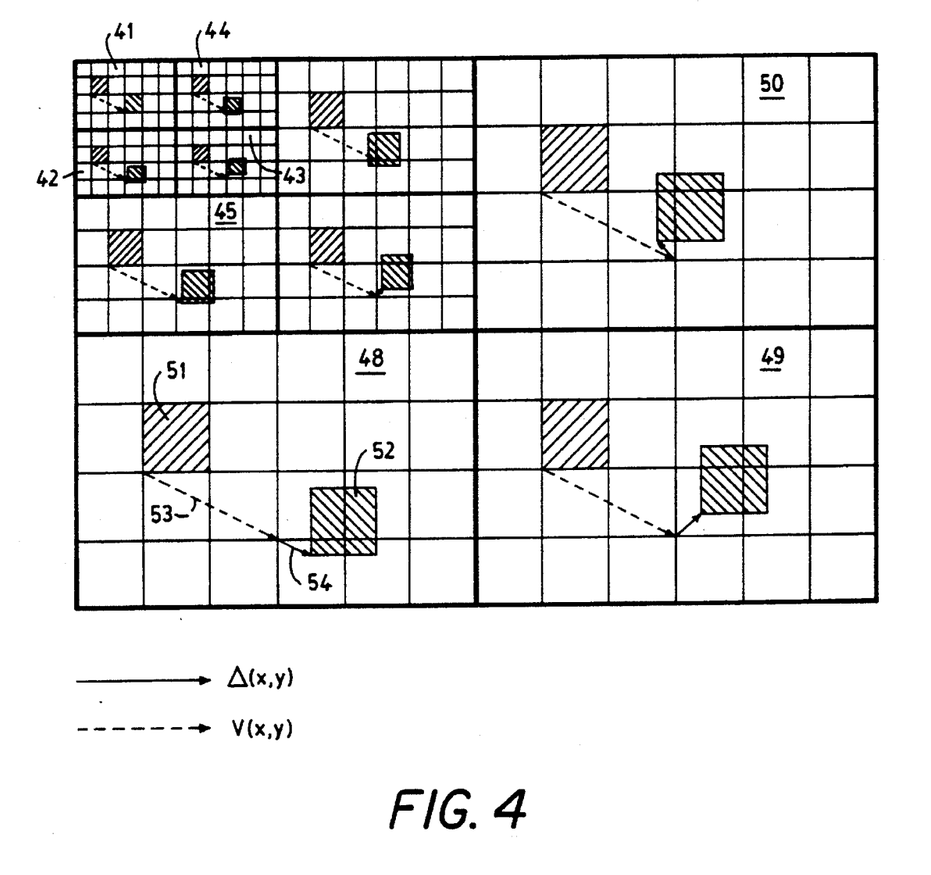
FIG. 4 illustrates exemplary vector displacements produced during motion estimation.

As noted above, FIG. 3 depicts motion estimation between a block 21 in current frame i (for a certain subimage) and a block in frame i−1 which satisfies a matching criteria, namely block with vector displacement V(x,y). FIG. 4 comprehensively illustrates motion estimation for an exemplary block in each subimage of the pyramid video representation of FIG. 1. More specifically, the ten grid areas designated 41–50 correspond to respective regions in the ten subimages $S_8, [W_8^j]_{j=1,2,3}, [W_4^j]_{j=1,2,3}, [W_2^j]_{j=1,2,3}$, respectively.

The blocks with shading, such as exemplary block 51, correspond to subimage blocks in current frame i, while the other block 52 corresponds to a block in previous frame i−1 satisfying the block matching criterion. The dashed-arrow vector 53 represents an initial estimate determined originally for subimage $S_8$. The solid-arrow vector 54 is the computed refinement vector which, when added to the initial estimate vector 53, produces the displacement vector defining the positional translation from block 51 in frame i to the matching block 52 in frame i−1.

As an initial step in the motion estimation scheme, the motion vector $V_8(x,y)$ for the highest layer subband $S_8$ is calculated by full search with an exemplary block size of 2×2 and a search area $\Omega$ of 9×9. This translates to an area of 36×36 at the original scale of the frame. This motion vector is then appropriately scaled to be used as an initial estimate in higher resolution subbands. In particular, the motion vector is used as an initial bias and then refined for lower layer wavelets using a full search algorithm with a smaller search zone. In this scheme, a block under predictive motion estimation is first vectorially displaced by the scaled vector (e.g., a scaled version of the initial bias) in the previous frame and the motion algorithm is then implemented to find the refinement vector $\Delta(x,y)$.

For example, in grid 8 corresponding to subimage $W_2^1$ in layer 1 of the pyramid representation of FIG. 1, block 54 was determined by the block-matching algorithm to satisfy the chosen matching criteria. Vector 53 is a scaled version of the motion vector $V_8(x,y)$ serving as an initial estimate for the motion vector between block 51 and 52. The extending vector 54 represents the incremental vector $\Delta(x,y)$ between the initial estimate 53 and the location of block 52.

Since the scale at every level goes down by 2 in each dimension, the motion vectors are scaled up by the same factor and used as an initial bias for the predictive search scheme, which refines this estimate by using full search with a reduced search area. The value of $\Omega'$ is again 9×9 but note that the block size has been increased by a factor of two in each dimension, thus reducing the effective search area for that resolution.

In general, the motion vector for frame i at any resolution m and band $j\{j=1,2,3\}$ is estimated by:

$$V^{(m)}_{i,j}(x,y) = E[V^{(m)}_{i,j}(x,y)] + \Delta^{(m)}(x,y) \qquad (1)$$

The initial estimate $E[V^{(m)}_{i,j}(x,y)]$ can be found using an autoregressive (AR) prediction model given by:

$$E[V^{(m)}_{i,j}(x,y)] = \Sigma \alpha_{pqr} V^{(m+n)}_{i-p,q}(x,y) \qquad (2)$$

where $\alpha_{pqr}$ is a set of prediction coefficients for each block and p,q,n are members of a set $\theta$ defined by:

$$\theta = \}p,q,n : p \geq 0\}\{q,n:n=0,1,\ldots,(M-m) \vee q\}\{p,q,n : q=0,\ldots 3\}(3).$$

The refinement term $\Delta(x,y)$ is obtained using the matching criteria MAD, for example, and is computed as follows:

$$\Delta^m(x,y) = \arg\min_{x_1,y_1 \in \Omega'} \left\{ \frac{1}{XY} \sum_{p=-X/2}^{X/2} \sum_{q=-Y/2}^{Y/2} |I_i(x_1+p, y_1+q) - I_{i-1}(x_1+p+x, y_1+q+y)| \right\} \qquad (4)$$

where $\Omega'$ is the sub-search area at the m-th layer.

Figure 5:
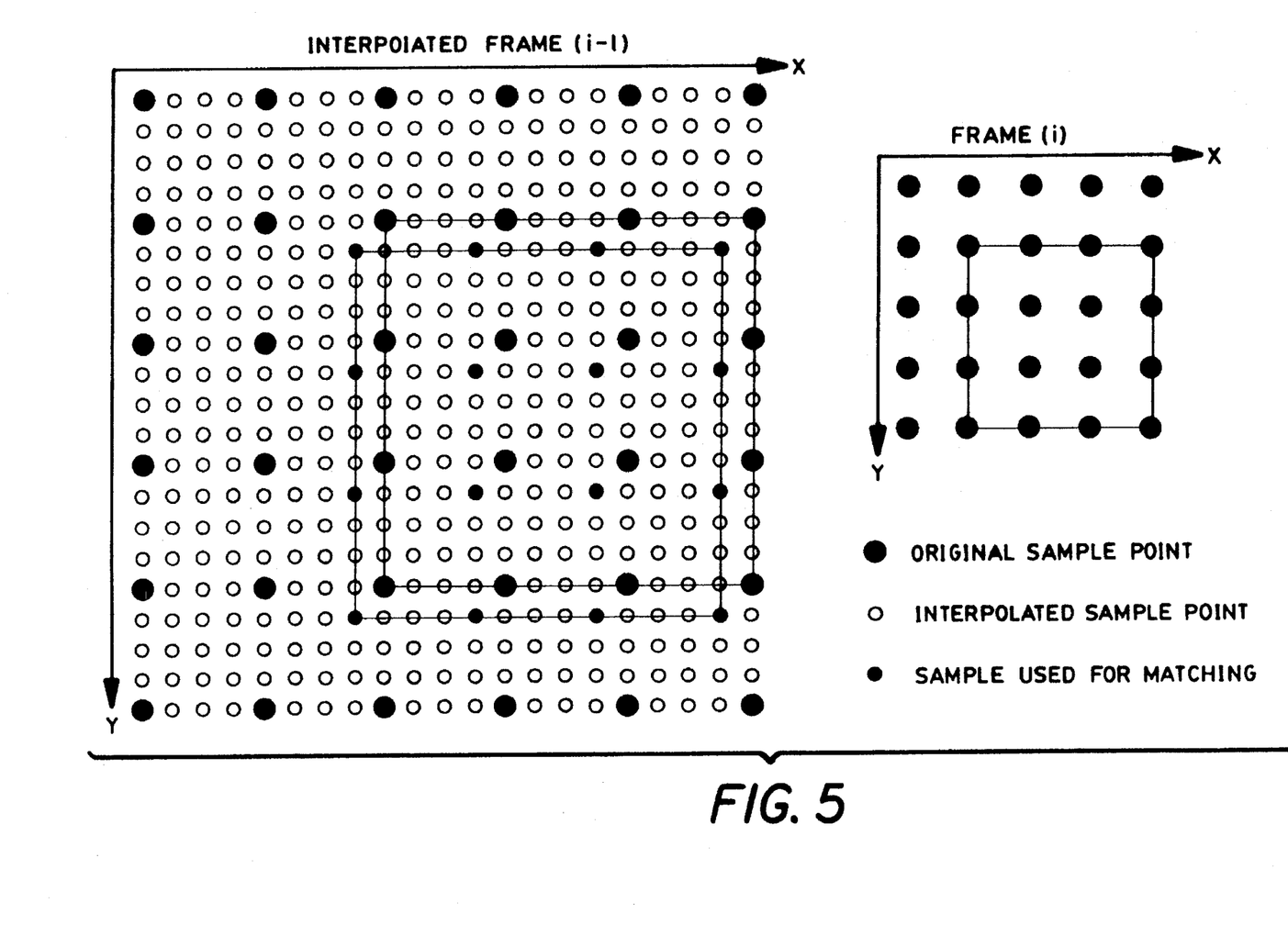
FIG. 5 is a block diagram for ¼-pixel accuracy motion search.

For sub-pixel accuracy, frame (i−1) is first interpolated to r times of its original size for 1/r-pixel accuracy using simple bilinear interpolation. The process of block matching for ¼-pixel accuracy is shown in FIG. 5. A block in frame (i) is first matched to its corresponding sample points in frame (i−1). The matching grid is then shifted by one sample point in frame (i−1), which corresponds to 1/r-pixel at the original scale. This increases the search complexity by a factor of $(r^2-1)$. Since the motion vectors for the highest layer are scaled up by a factor of $2^{M-m}$, interpolation is required at the next layer if $2^{M-m}/r$ is less than one. Hence, for ½-pixel accuracy, only the highest layer subbands are interpolated, while for ¼-pixel accuracy, the top layer is interpolated by a factor of four and the next layer by a factor of two.

Several variations in the implementation of the predictive search algorithm for multi-resolution motion estimation are possible. The following algorithms are exemplary implementations which are presented for illustrative purposes only and should not serve as a limitation of the present invention.

A-I: Motion vectors are calculated for $S_8$ and no further refinement is carried out. The values are scaled according to the resolution and used for all the other subbands.

A-II: The motion vectors are calculated for all four lowest resolution frequency bands, i.e , $S_8$ and $\{W_8{}^i : i=1,2,3,\}$. These values are appropriately scaled and used as the motion vectors for all the corresponding higher resolution subbands in the corresponding bands.

A-III: The motion vectors for $S_8$ are calculated and used as an initial bias for all the other frequency bands and resolutions.

A-IV: The motion vectors are calculated for all frequency bands at the highest level, i.e., $\{S_8, W_8{}^1 : i=1,2,3\}$ are estimated and used as initial bias for refining the motion vectors for all lower levels using the corresponding band motion vectors.

Algorithms A-I and A-III use the simplest model in Equation (1), supra, where all of the prediction coefficients are zero except for $\alpha_{003}$ which is set to $2^{M-m}$. Thus, the motion vectors at the resolution m are given by:

$$V^{(m)}_{i,j}(x,y) = V^{(M)}_{i,0}(x,y) 2^{M-m} + \Delta^{(m)}(x,y) \qquad (5)$$

for $\{j=1,2,3\}$. For algorithm A-I, $\Delta^{(m)}(x,y)$ is set to zero. Similar equations apply to algorithms A-II and A-IV.

The algorithms are implemented in general terms with a frame size of N×N, a search area of in in each direction, and a desired accuracy of 1/r-pixel. The number of computations for each block is $(r^2-1)(2n+1)^2$ for $r>1$. As a result of the wavelet decomposition, there are three subbands of size (N/2)×(N/2) and (N/4)×(N/4) each, and four subbands of size (N/8)×(N/8). Assuming that a block size of p is chosen for the lowest resolution (e.g., the highest level of the pyramid), the number of blocks in each subband is $N^2/64p^2$.

Thus, the total number of searches for subband $S_8$ is given by $N^2(r^2-1)(2n+1)^2/64p^2$. Since the search area is $r(2n+1)$ in each direction, the number of bits required to represent one component of a motion vector will be less than or equal to $[\log_2 r(2n+1)]$, depending upon the entropy- The multi-resolution approach gains its advantage from the fact that one pixel motion at level m translates to $2^{M-m}$ pixels at the original scale.

TESTBED IMPLEMENTATION

The variable-block size MRME scheme described hereinabove was implemented in a testbed including a digital video recorder with realtime acquisition/playback of 25 seconds of video signals. The recorder is interfaced to a host machine where the compression algorithms are applied to the acquired frames. The reconstructed video segments are then transferred back to the video recorder and viewed at full frame rate for comparison with the original signal. The implementation used a test sequence 'CAR' which is a full-motion interlaced color video sequence.

Figure 6A:
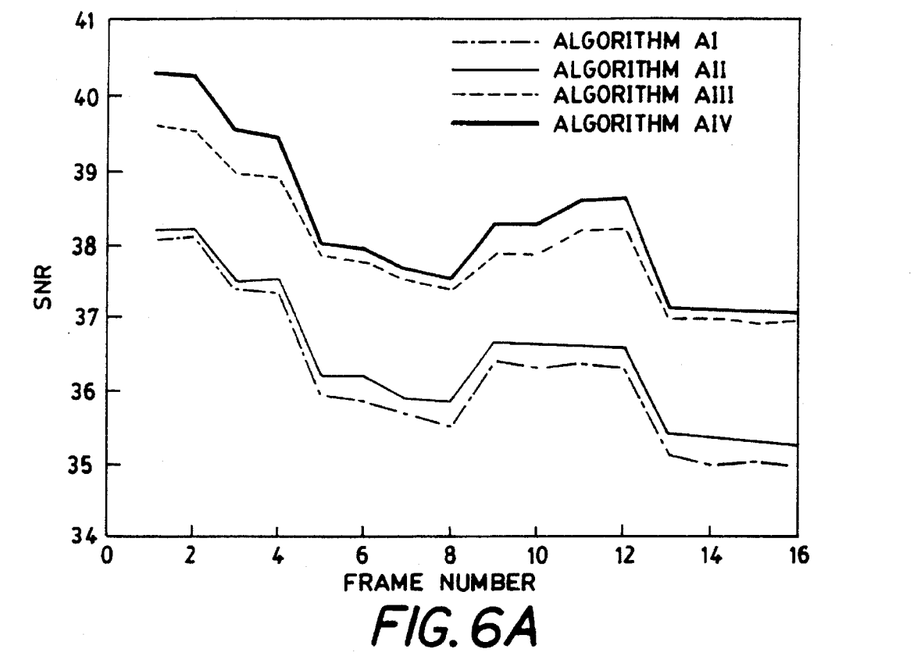
FIGS. 6A–6C graphically depict the S/N ratio of various motion estimation algorithms for integer, ½, and ¼ pixel accuracies.
Figure 6B:
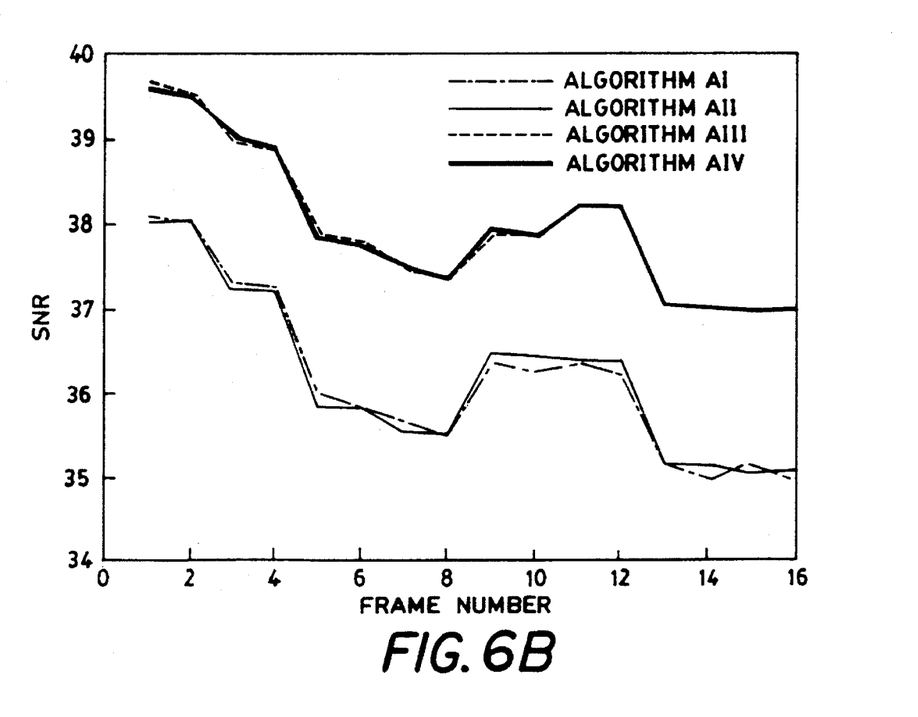
Figure 6C:
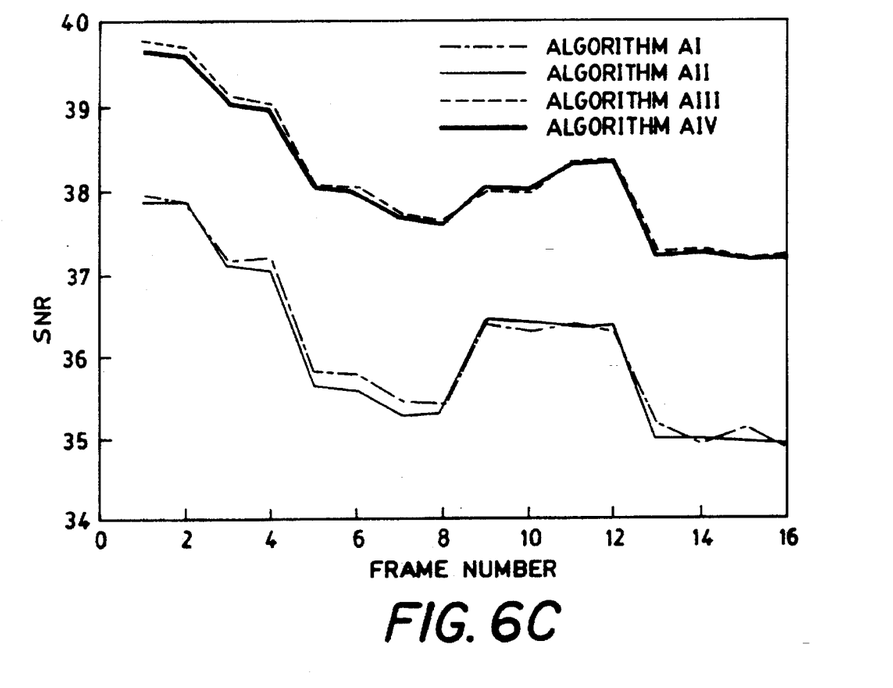
Figure 7A:
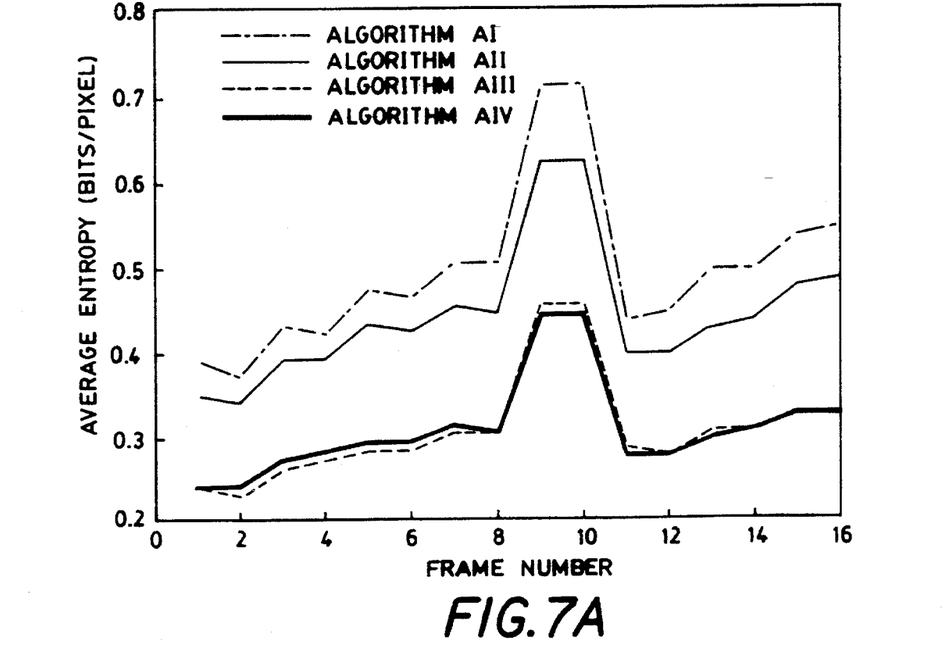
FIGS. 7A–7C graphically depict the average entropy in a luminance component for integer, ½, and ¼ pixel accuracy of various motion estimation algorithms.
Figure 7B:
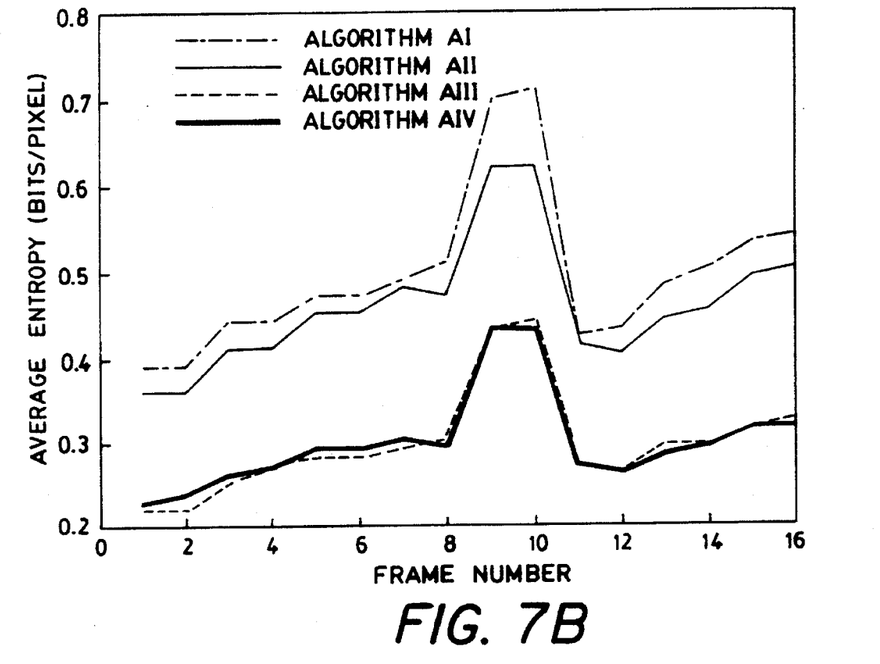
Figure 7C:
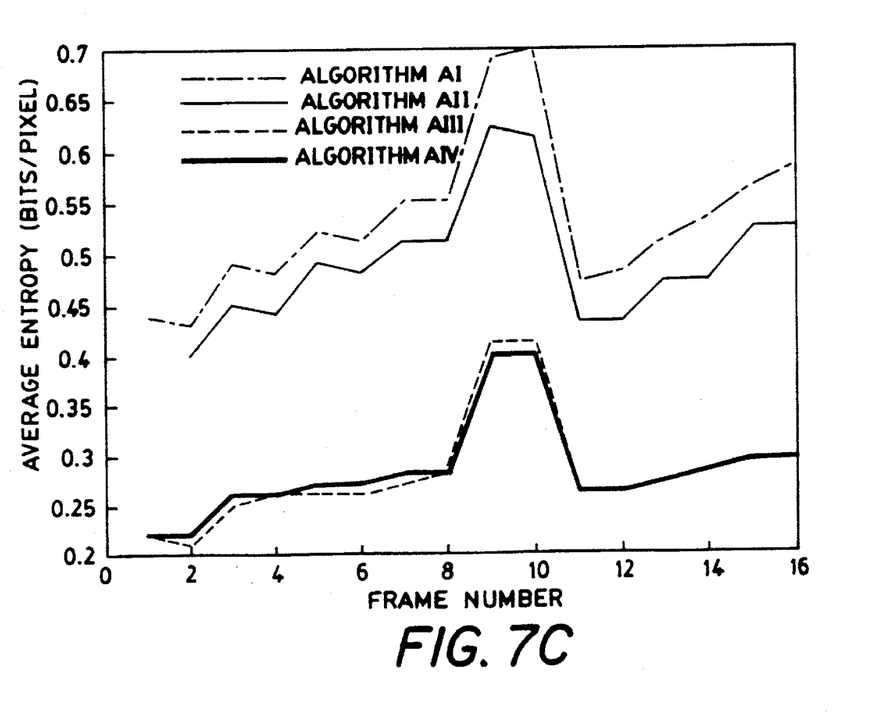

The implementation testbed permitted a comparative evaluation of the compression performance, quality degradation, and computational efficiency for the various coding algorithms A-I through A-IV described above. Tables 1–3 presented below illustrate the energy distributions of the algorithms for different pixel accuracies. FIGS. 6 and 7 graphically depict the S/N ratio and average entropy, respectively, for different pixel accuracies.

TABLE 1

4/43 Energies in a Displaced Residual Wavelet frame for Algorithms A-I through A-IV

| Energy | $S_8$ | $W_8^1$ | $W_8^2$ | $W_8^3$ | $W_4^1$ | $W_4^2$ | $W_4^3$ | $W_2^1$ | $W_2^2$ | $W_2^3$ |
|---|---|---|---|---|---|---|---|---|---|---|
| Original Signal | 49587.23 | 7361.20 | 452.91 | 148.47 | 1391.86 | 65.89 | 18.46 | 203.53 | 7.48 | 3.31 |
| A-I | 336.00 | 848.63 | 155.74 | 193.20 | 428.40 | 53.07 | 37.12 | 110.65 | 5.26 | 1.28 |
| A-II | 336.00 | 195.58 | 44.32 | 28.34 | 414.99 | 44.54 | 21.62 | 97.47 | 4.31 | 0.55 |
| A-III | 336.00 | 186.16 | 44.56 | 29.01 | 138.83 | 13.58 | 4.65 | 39.96 | 1.02 | 0.05 |
| A-IV | 336.00 | 195.58 | 44.32 | 28.34 | 139.71 | 15.14 | 7.37 | 38.61 | 0.78 | 0.19 |

Table 1 shows the variance or the energy distribution among different subbands for the luminance component of a typical frame before and after applying the algorithms A-I through A-IV. It can be seen from the first row of the table, which shows the energy in the original subbands before applying any form of motion compensation, that the wavelet decomposition compacts most of the energy in $S_8$ for the original video signal. Typically, $S_8$ contains about 85% of the energy in the original signal although its scale is down by a factor of eight in both dimensions. After motion compensation, the energies in all subbands are considerably reduced. The reduction is at least by an order of a magnitude for the highest layer subbands and more than two orders of magnitude for $S_8$. This significant decrease of energy in the perceptually most significant subband is a result of the accurate motion estimation. This layer is the most important layer in terms of visual perception and is appropriately weighed in variable block-size multi-resolution motion estimation schemes. The importance of accurate motion estimation is further emphasized by the results obtained with sub-pixel accuracies in estimating the motion vectors at the highest level. Tables 2 and 3 below show the energy distributions of the subbands for ½-and ¼-pixel accuracies, respectively.

The energy distribution among the chrominance components U and V follows a similar pattern to that in the Y-component. In most cases, the luminance signal contains more than 60% of the total energy of the original signal and the U and V-components have less than 20%, respectively. In order to appropriately weigh the Y,U and V-components according to this distribution, the normalizing factor which controls the quantization is set to a higher value for the U and V components than that for the luminance signal. Higher values result in coarser quantization, thus reducing the emphass given to that component.

FIGS. 6A–6C show the reconstructed Signal-to-Noise Ratio of the four algorithms for integer, ½, and ¼ pixel accuracies. Clearly, algorithm A-IV gives the best performance, closely followed by A-III. The search complexity and motion overhead for both alternatives are the same. The difference in the reconstructed SNR between the two algorithms is less than 1 dB for 1-pixel accuracy and becomes negligible as the accuracy is increased. Similar results hold true for the other two algorithms which follow each other very closely. The SNR of algorithm A-II is not much different from that of A-I despite the four fold increase in computation and overhead. A 2 dB gain can be achieved by using A-III or A-IV over the other two, but at the expense of

TABLE 2

Energies in DRS for 1/2-pixel accuracy at highest layer

| Energy | $S_8$ | $W_8^1$ | $W_8^2$ | $W_8^3$ | $W_4^1$ | $W_4^2$ | $W_4^3$ | $W_2^1$ | $W_2^2$ | $W_2^3$ |
|---|---|---|---|---|---|---|---|---|---|---|
| A-I | 218.67 | 865.94 | 196.91 | 133.90 | 452.05 | 48.81 | 20.03 | 110.74 | 5.14 | 0.76 |
| A-II | 218.67 | 121.51 | 38.87 | 20.60 | 522.38 | 50.47 | 25.53 | 113.80 | 5.14 | 0.81 |
| A-III | 218.67 | 122.19 | 38.92 | 19.60 | 112.47 | 15.91 | 4.62 | 37.88 | 0.90 | 0.07 |
| A-IV | 218.67 | 121.51 | 38.87 | 20.60 | 150.61 | 15.57 | 6.49 | 41.01 | 0.88 | 0.24 |

TABLE 3

Energies in DRS for 1/4-pixel accuracy at highest layer

| Energy | $S_8$ | $W_8^1$ | $W_8^2$ | $W_8^3$ | $W_4^1$ | $W_4^2$ | $W_4^3$ | $W_2^1$ | $W_2^2$ | $W_2^3$ |
|---|---|---|---|---|---|---|---|---|---|---|
| A-I | 139.09 | 823.49 | 150.83 | 118.02 | 645.07 | 47.38 | 37.48 | 127.73 | 4.55 | 1.09 |
| A-II | 139.09 | 85.64 | 31.50 | 14.32 | 645.07 | 47.38 | 37.48 | 153.67 | 4.69 | 1.26 |
| A-III | 139.09 | 84.86 | 31.93 | 13.77 | 84.01 | 8.41 | 4.12 | 43.45 | 1.00 | 0.05 |
| A-IV | 139.09 | 85.64 | 31.50 | 14.32 | 84.01 | 8.41 | 4.12 | 44.35 | 0.88 | 0.24 |

Although the energy decreases dramatically for $S_8$, it may even increase for other subbands if the motion vectors are not refined as in the case of Algorithm A-I and A-II. However, even when the motion vectors are refined as in Algorithms A-III and A-IV, some anomalies may still arise because of the reduced search area $\Omega$. As an example the energy in $W_4^1$ using A-IV is 139.71 for integer pixel accuracy and 150.61 when ½-pixel accuracy is used. In general, Algorithms A-III and A-IV produce less energy than A-I and A-II regardless of the pixel accuracy.

added complexity and overhead. It should be noted that since the instantaneous SNR highly depends upon the amount of motion present in the scene, the curves follow the same general pattern for all the algorithms and all the accuracies. The SNR for integer pixel accuracy is slightly better than the corresponding sub-pixel counterparts.

The first-order entropies of the ten subbands in the luminance signal after quantization are shown in FIGS. 7A–7C. The average entropy translates directly to the number of bits required to encode the whole frame and thus contributes to the instantaneous bit rate of the coder. Algorithms A-III and A-IV again outperform A-I and A-II with the lowest entropy as expected. There is a marked difference in the entropy and thus the bit rate offered by these two schemes as compared to algorithms A-I and A-II. Although the entropy is directly related to the amount of motion in a particular frame, the increase at the $8^{th}$ frame, in particular, is due to the periodic refreshment frame being transmitted. After every eight frames, an intra-frame coded picture is transmitted to provide synchronization and eliminate accumulation of quantization errors. The entropy of the ten individual subbands for a typical frame using ¼-pixel accuracy is shown in Table 4 below.

TABLE 4

| Entropy | Entropy (bits/pixel) of DRS for 1/4-pixel accuracy | | | | | | | | | | |
|---|---|---|---|---|---|---|---|---|---|---|---|
| | $S_8$ | $W_8^1$ | $W_8^2$ | $W_8^3$ | $W_4^1$ | $W_4^2$ | $W_4^3$ | $W_2^1$ | $W_2^2$ | $W_2^3$ | Average |
| A-I | 2.00 | 2.62 | 1.58 | 1.31 | 2.13 | 0.43 | 0.33 | 0.51 | 0.05 | 0.01 | 0.44 |
| A-II | 2.00 | 1.57 | 0.67 | 0.51 | 2.13 | 0.43 | 0.33 | 0.53 | 0.05 | 0.01 | 0.40 |
| A-III | 2.00 | 1.58 | 0.69 | 0.50 | 1.03 | 0.16 | 0.12 | 0.23 | 0.01 | 0.00 | 0.22 |
| A-IV | 2.00 | 1.57 | 0.67 | 0.51 | 1.03 | 0.16 | 0.12 | 0.25 | 0.01 | 0.00 | 0.22 |

$S_8$ has the highest entropy as it contains most of the information. The contribution to the bit rate from the highest layer is the most significant despite their smaller sizes as compared to the subbands in the other layers. The values of entropy depend on the normalizing factor discussed earlier and the amount of motion in a particular direction. Wavelets in the same layer exhibit different behavior in terms of energy contents and entropy depending on the motion present in the direction to which they are sensitive. Some of the subbands show a value of zero, which means that the coefficients after normalizing are insignificant and thus truncated to zero. This particular subband will not play any part in the reconstruction. Examples are $W_2^3$ for Algorithms A-III and A-IV.

While there has been shown and described herein what are presently considered the preferred embodiments of the invention, it will be obvious to those skilled in the art that various changes and modifications can be made therein without departing from the scope of the invention as defined by the appended Claims.

What is claimed is:

1. A method of computing motion vectors for a frame in a full-motion video sequence, comprising the steps of:

transforming said frame into a multifrequency, multiresolution domain representation by decomposing said frame into a plurality of subframes each subframe having an associated resolution m and occupying a respective frequency band, wherein one subframe of said plurality of subframes has the lowest resolution;

dividing each subframe into a set of blocks defining a grid, wherein the size of each block is based on the associated resolution of said subframe;

calculating a first motion vector, relative to a previous frame, for each block of said subframe with the lowest resolution;

calculating a second motion vector by motion compensation for each block of each other subframe of said plurality of subframes, comprising the steps of scaling said first motion vector corresponding to a respective block of said subframe with the lowest resolution to obtain a scaled motion vector, and calculating a second motion vector, relative to the previous frame, for each block under motion compensation using the scaled motion vector as an inital bias.

2. The method as recited in claim 1 wherein the dividing step includes the step of:

computing the size of each block based on the relationship $\{p2^{M-m} \times P2^{M-m}\}$, wherein p is a constant, and M represents the total number of different resolutions employed in said transforming step.

3. The method as recited in claim 1 wherein the step of calculating a first motion vector includes the steps of:

defining a search area within the previous frame having a like set of blocks;

comparing each block of said subframe with the lowest resolution with each block of said search area to find a matching block in said previous frame satisfying a match criteria;

wherein said first motion vector represents a positional displacement of the block in said subframe with the lowest resolution, relative to the matching block in said previous frame.

4. The method as recited in claim 1 wherein the scaling step includes the step of:

scaling said first motion vector proportional to the ratio of the resolution of a subframe to the resolution of said subframe with the lowest resolution;

wherein said respective block corresponds to the block in said lowest resolution subframe in a like position as the block under motion compensation.

5. The method as recited in claim 4 wherein the scaling step includes the step of:

multiplying said first motion vector from the subframe having the lowest resolution by the quantity $2^{M-m}$, wherein M represents the total number of different resolutions employed in said transforming step.

6. A compression method for a frame f(t) in a full-motion video sequence, comprising the steps of:

deriving a wavelet representation of said frame defined by a plurality of subimages each with a different resolution and corresponding to a respective frequency band, wherein one of said subimages has the lowest resolution;

organizing each of said subimages into a grid of non-overlapping image blocks;

calculating a motion field for each image block of said subimage with the lowest resolution by block-matching an image block with each block within a defined search area of the preceding frame in said video sequence until an optimal match is found;

deriving a bias motion vector for each block in each other subimage of said plurality of subimages said bias motion vector representing a scaled version of the motion field for a respectively corresponding block in said subimage with the lowest resolution; and calculating a motion field, relative to the preceding frame, for each block using the respective bias motion vector.

7. The method as recited in claim 6 wherein said block-matching includes the step of:

executing a prespecified distortion function.

8. The method as recited in claim 6 wherein the step of deriving a wavelet representation includes the step of:

wavelet transforming said frame f(t) between a scale of $2^l$ and $2^M$ into a sequence of subimages characterized by $$\{S_{2^M} f(t), [W^j_{2^M} f(t)]_{j=1,2,3} \ldots [W^j_{2^l} f(t)]_{j=1,2,3}\}$$

wherein $S_{2^M} f(t)$ is a smoothed version of f(t) spanned by a scaling function at resolution $2^M$, and $W^j_{2^i} f(t)$ (i=1 to M, j=1,2,3) is a wavelet transform function corresponding to an approximation of f(t) at resolution $2^i$.

* * * * *